(12) United States Patent
Kim

(10) Patent No.: US 7,681,243 B2
(45) Date of Patent: Mar. 16, 2010

(54) METHOD AND APPARATUS FOR PROCESSING DIGITAL RIGHTS MANAGEMENT CONTENTS CONTAINING ADVERTISING CONTENTS

(75) Inventor: Jea-Un Kim, Gyeonggi-Do (KR)

(73) Assignee: LG Electronics, Inc., Seoul (KR)

( * ) Notice: Subject to any disclaimer, the term of this patent is extended or adjusted under 35 U.S.C. 154(b) by 1134 days.

(21) Appl. No.: 11/267,319

(22) Filed: Nov. 7, 2005

(65) Prior Publication Data

US 2006/0117391 A1 Jun. 1, 2006

(30) Foreign Application Priority Data

Nov. 6, 2004 (KR) .................. 10-2004-0090117

(51) Int. Cl.
  *H04N 7/16* (2006.01)
  *G06F 7/04* (2006.01)
  *G06F 17/30* (2006.01)

(52) U.S. Cl. ........................... 726/27; 713/168

(58) Field of Classification Search ................. 713/168; 726/27

See application file for complete search history.

(56) References Cited

U.S. PATENT DOCUMENTS

2002/0138593 A1* 9/2002 Novak et al. ................. 709/219
2003/0028888 A1* 2/2003 Hunter et al. ................. 725/89
2004/0210538 A1* 10/2004 Forest ......................... 705/80
2005/0033700 A1* 2/2005 Vogler et al. ................. 705/57
2006/0100924 A1* 5/2006 Tevanian, Jr. ................ 705/14

FOREIGN PATENT DOCUMENTS

KR 1020000024643 A 5/2000
KR 1020010106695 A 12/2001

OTHER PUBLICATIONS

Open Mobile Alliance. "DRM Specification V2.0", Draft Version 2.0, Apr. 20, 2004.*
Open Mobile Alliance. "DRM Architecture", Draft Version 2.0, Mar. 15, 2004.*
Open Mobile Alliance. "DRM Content Format V2.0", Draft Version 2.0, Apr. 20, 2004.*
Open Mobile Alliance. "Download Architecture", Approved Version 1.0, Jun. 25, 2004.*

* cited by examiner

*Primary Examiner*—Michael J Simitoski
(74) *Attorney, Agent, or Firm*—McKenna Long & Aldridge

(57) ABSTRACT

A method and apparatus for processing digital rights managements (DRM) contents having advertisement (AD) contents attached thereto in a DRM system are disclosed. When DRM contents including AD contents are selected by a DRM device, a rights issuer (RI) receives the AD contents and the DRM contents from a contents issuer (CI), generates a multipart contents format file, and downloads it to the DRM device. Then, the DRM device decodes the downloaded multipart contents format file to check whether the multipart contents format file includes AD contents-attached DRM contents, and if so, the DRM device reproduces the AD contents to use the DRM contents free of cost. Thus, the DRM contents can be provided to a user by using the AD contents without causing a burden of a charge.

31 Claims, 4 Drawing Sheets

US 7,681,243 B2

METHOD AND APPARATUS FOR PROCESSING DIGITAL RIGHTS MANAGEMENT CONTENTS CONTAINING ADVERTISING CONTENTS

This application claims priority to Korean Application No. 2004-0090117 filed on Nov. 6, 2004, which is incorporated by reference, as if fully set forth herein.

BACKGROUND OF THE INVENTION

1. Field of the Invention

The present invention relates to a digital rights management (DRM) system and, more particularly, to an apparatus and method for processing DRM contents having advertising contents attached thereto capable of allowing a user to receive DRM contents having advertising contents (referred to, hereinafter, as 'AD contents') attached thereto provided by a DRM system and to reproduce/use the DRM contents free of charge by reproducing the AD contents.

2. Description of the Related Art

With Internet businesses related to online communities, electronic transactions, or the like are continuing to be developed, most online contents providers are providing diverse contents to arouse the interest of users, by mainly providing multimedia services, such as music, images and video, as well as text. Various multimedia data is applied to various fields such as Internet broadcasting, education, news, sports, travel information, professional consulting, or the like, thus creating new types of services. Compared with analog contents, digital contents are advantageous in terms of its generation, processing, circulation and distribution, but in this case, the properties of digital contents of being easily copied cause a serious problem with respect to the protection of copyrights for works of digital creation.

A DRM system is a mechanism for stably protecting and systematically managing rights for digital assets, which provides a protection and management system with respect to a process by which contents are generated, published, distributed and used, as well as preventing unauthorized copying of contents.

The DRM system prevents illegal copying of contents such that digital contents are always provided in a coded state to allow an authenticated user to instantly decode to use it, and even if contents are somehow copied, if a user is not authenticated, he or she cannot use the contents.

The DRM system continuously protects digital contents and has various usage rules. In addition, DRM technique-applied contents are expected to follow the method of circulating, distributing and using existing digital information as it is, and a technical protection measure of the DRM must not cause user inconvenience.

Generally, users increasingly want to receive more various contents and also want to receive DRM contents at a low cost or without the burden of fees or charges. That is, a general DRM system needs to employ a method for providing DRM contents to users without incurring any fee charges.

BRIEF DESCRIPTION OF THE INVENTION

Therefore, one object of the present invention is to provide a method and apparatus for processing digital rights management (DRM) contents having advertising contents (AD contents) attached thereto, whereby the DRM system provides DRM (protected) contents including AD contents to a user and the user can use the DRM contents free of charge by reproducing the AD contents.

Another object of the present invention is to provide a method and apparatus for processing digital rights management (DRM) contents having AD contents attached thereto capable of generating DRM contents with the AD contents.

Still another object of the present invention is to provide a method and apparatus for processing digital rights management (DRM) contents having AD contents attached thereto capable of allowing a DRM device to analyze DRM contents having AD contents attached thereto and reproduce the advertising contents to allow reproducing of the DRM contents free of charge.

To achieve at least the above objects in whole or in parts, there is provided a system for processing digital rights management (DRM) contents having advertising contents (AD contents) attached thereto, including: a rights issuer (RI) for generating single contents by attaching AD contents to DRM contents and issuing rights with respect to the contents; and a DRM device for obtaining the AD contents-attached DRM contents and reproducing the AD contents to use the DRM contents.

To achieve at least these advantages in whole or in parts, there is further provided a method for processing digital rights management (DRM) contents having advertising contents (AD contents) attached thereto in a DRM system, wherein an AD contents view header indicating attachment of AD contents is added to multi-contents format file, into which AD contents and DRM contents are inserted, so that when the AD contents of the multi-contents format file are reproduced, the DRM contents can be used.

To achieve at least these advantages in whole or in parts, there is further provided a method for processing digital rights management (DRM) contents having advertising contents (AD contents) attached thereto, including: selecting by a DRM device DRM contents having AD contents attached thereto; providing by a PS information on the AD contents-attached DRM contents to an RI; requesting by the RI the AD contents and the DRM contents from a contents issuer (CI); providing by the CI the AD contents and the DRM contents to the RI; and generating a multi-contents format file by the RI by using the AD contents and the DRM contents and downloading the multi-contents format file to the DRM device.

To achieve at least these advantages in whole or in parts, there is further provided a DRM system which uses a multi-contents format file including an AD contents view header indicating attachment of AD contents and one or more contents including AD contents.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE INVENTION

The present invention proposes a method and apparatus whereby digital rights management (DRM) contents having advertising (AD) contents attached thereto are generated and provided to a user. When the user downloads the DRM contents, the user first reproduces the AD contents, which then allows the DRM contents to be reproduced in reward for the user's viewing of the AD contents.

Some embodiments of the present invention will now be described in detail with reference to the accompanying drawings.

Figure 1:
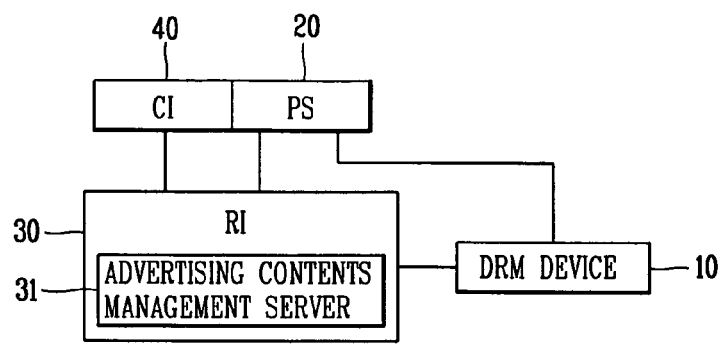
FIG. 1 shows an exemplary construction of a DRM system for processing DRM contents having AD contents attached thereto in accordance with the present invention.

FIG. 1 shows an exemplary construction of a DRM system for processing DRM contents having AD contents attached thereto in accordance with the present invention.

As shown in FIG. 1, a DRM system for processing DRM contents having AD contents attached thereto can include a rights issuer (RI) 30 for generating single contents by attaching AD contents to DRM contents and issuing rights with respect to the contents; and a DRM device 10 for obtaining the AD contents-attached DRM contents and reproducing the AD contents to use the DRM contents.

The DRM system can further include a contents issuer (CI) 40 for providing the AD contents and the DRM contents; and a presentation server (PS) 20 for providing a kind of a method for using the AD contents-attached DRM contents without charge.

The CI 40 can be an advertiser or a sponsor.

The RI 30 can include an AD content management server 31 for managing rights of AD contents-attached DRM contents according to AD contents usage state information reported by the DRM device 10 and collecting statistics information of the AD contents according to the report of the AD contents usage state information.

The AD contents management server 31 can be operated by an advertiser or a sponsor.

Figure 2:
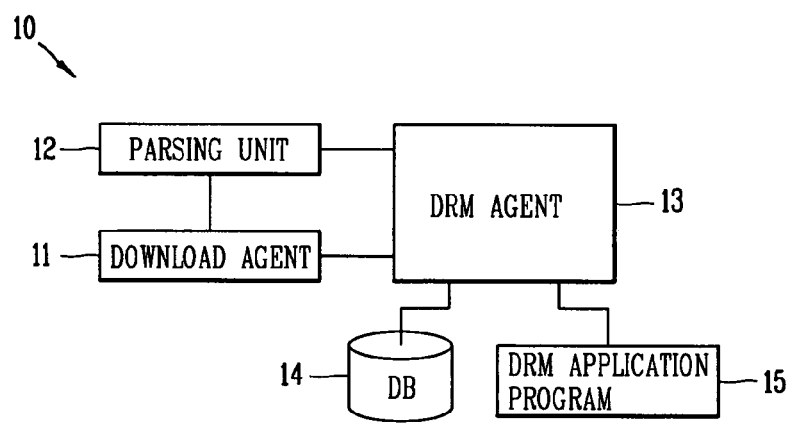
FIG. 2 is a schematic block diagram showing an exemplary construction of a DRM device.

As shown in FIG. 2, the DRM device 10 can include a download agent 11 for downloading DRM contents having AD contents attached thereto; a parsing unit 12 for checking whether the DRM contents has the AD contents and decoding the DRM contents; a DRM agent 13 for connecting the decoded DRM contents and the AD contents with a DRM application program 15 and managing rights of the DRM contents according to usage of the AD contents; a database (DB) 14 for managing rights state information of the DRM contents; and a DRM application program 15 for reproducing the DRM contents and the AD contents.

The DRM device 10 can be a mobile terminal such as a PDA (Personal Digital Assistant) or a mobile communication terminal.

First, an exemplary method for generating DRM contents by inserting AD contents by the RI 30 will be described.

In the present invention, an AD contents view header (ADview header) for indicating that DRM contents contain AD contents, is added to a DCF (DRM Content Format) of a DCF specification. The DCF header commonly has a common header that has a textual header. The ADview header is added to the textual header.

The DCF having the ADview header refers to a multipart DCF including two contents, namely, target contents (DRM contents that the DRM device actually wants to use) and AD contents (contents to be actually reproduced in order to use the target contents free of charge). Accordingly, a contents type of the multipart CDF including the ADview header can have a target contents type (type of valuable contents to be protected by the DRM) and a type of AD contents (type of contents used for advertisement), and the two contents must exist in a single multipart DCF.

Figure 3:
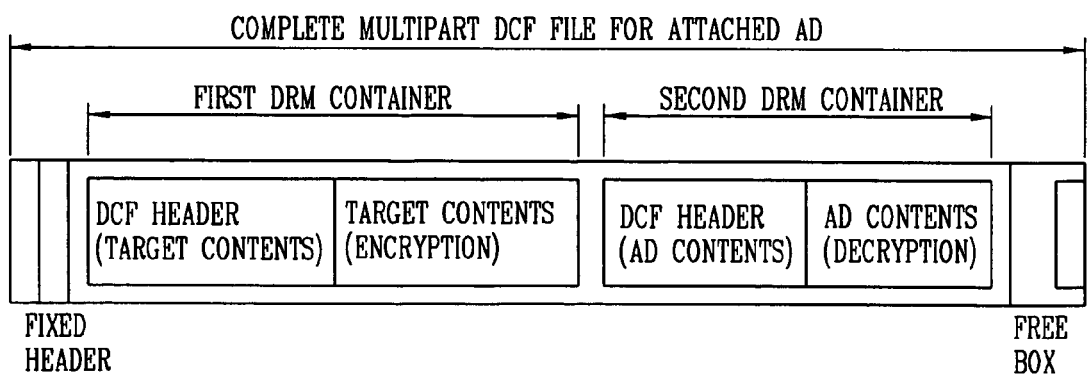
FIG. 3 shows an exemplary construction of a multipart DCF (DRM Contents Format) file having AD contents attached thereto in accordance with the present invention.

FIG. 3 shows an exemplary construction of a multipart DCF file having AD contents attached thereto in accordance with the present invention.

The multipart DCF file having the AD contents includes a header, a first DRM container for target contents (DRM contents) and a second DRM container for AD contents to be reproduced in order to use the target contents free of charge.

The first DRM container includes target contents and a target contents DCF header, and the second DRM container includes AD contents and an AD contents DCF header. The target contents DCF header of the first DRM container additionally includes a first AD contents view header (first ADview header) for indicating the attachment of AD contents, and the first ADview header has a target contents type parameter.

The AD contents DCF header of the second DRM container can additionally include a second ADview header for indicating the attachment of AD contents and the second ADview header has an AD contents type parameter.

The RI 30 can generate the multipart DCF file based on AD contents and DRM contents selected by a user.

Namely, the RI 30 can add the first ADview header to a DCF header field of the first DRM container of the multipart DCF file, can record the DRM contents in a contents field of the first DRM container, can add the first ADview header to the DCF header field of the second DRM container of the multipart DCF file, and can record the AD contents in the contents field of the second DRM container.

The RI 30 can add a target contents type in the first ADview header included in the DCF header field of the first DRM container, and can add an AD contents type in the second ADview header field included in the DCF header field of the second DRM container.

The RI 30 can designate an AD contents ID (adview-element-uri) parameter and an AD contents management server location information (adview-report-url) parameter for the target contents type, and can set an algorithm ID parameter and an encryption method header as null for the AD contents type.

The AD contents ID parameter can have a specific ID value and indicates an ID of AD contents to be reproduced for advertisement.

The AD contents management server location information parameter indicates information (URL: Uniform Resource Locator) regarding the location of a server to which the DRM device 10 transmits authentication information of the DRM device 10 and permission information to report AD contents usage state information after reproducing AD contents. The 'null' set in the algorithm ID parameter and the encryption method header indicates that AD contents corresponding to the AD contents type has not bee encrypted.

In this manner, by storing AD contents and DRM contents respectively in the corresponding DRM container of the multipart DCF file, the RI 30 generates a multipart DCF file.

A method according to which the DRM device 10 downloads the multipart DCF including AD contents-attached DRM contents, decodes the multipart DCF to check whether the multipart DCF contains the AD contents-attached DRM contents, and reproduces the AD contents included in the decoded multipart DCF file to use the DRM free of cost will now be described.

Figure 4:
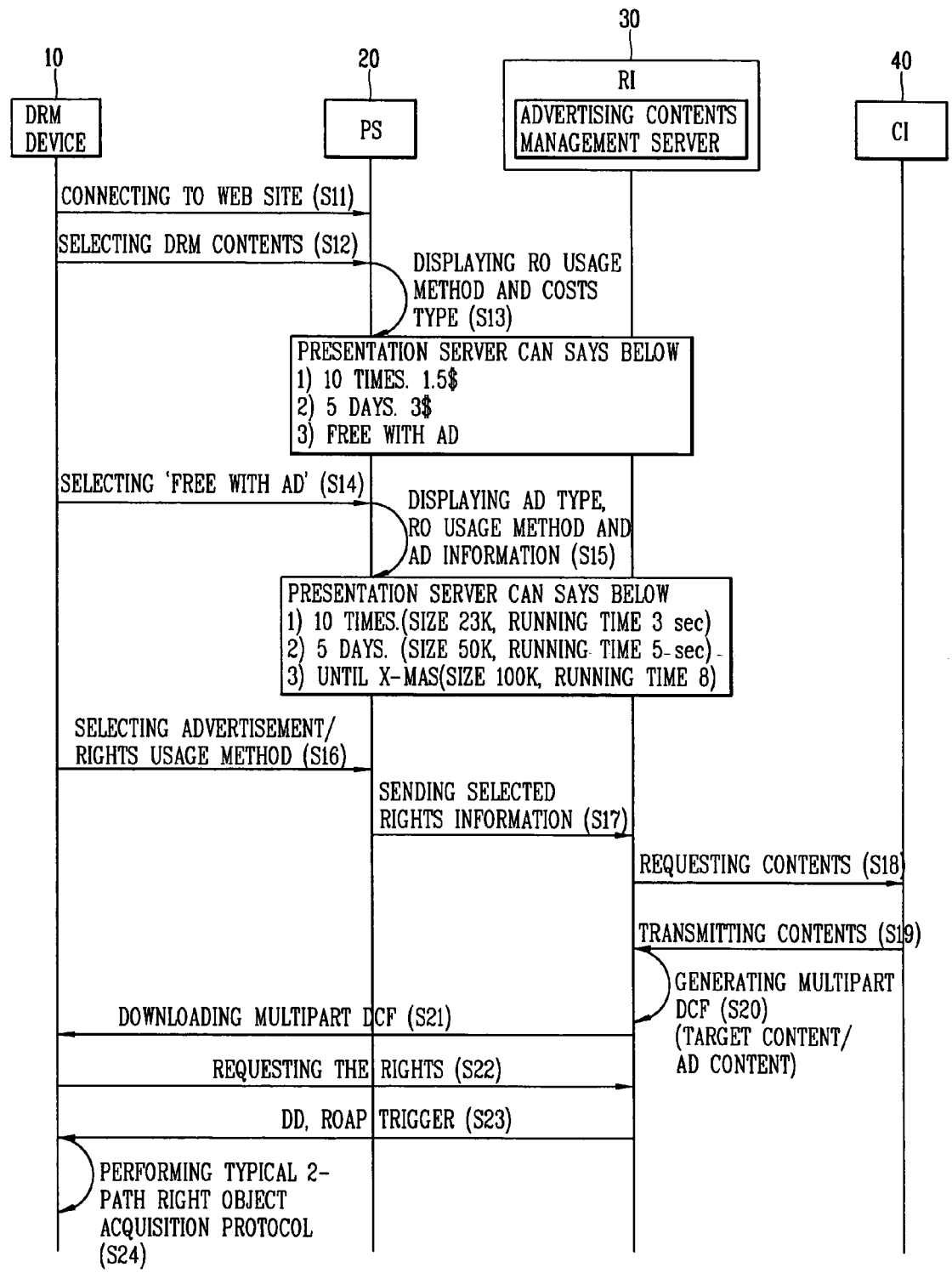
FIG. 4 shows an exemplary method for downloading DRM contents having AD contents attached thereto in accordance with the present invention.

FIG. 4 shows an exemplary method for downloading DRM contents having AD contents attached thereto in accordance with the present invention.

The DRM device 10 is connected with a website of the PS 20 (step S1) and selects single DRM contents (step S12). Then, the PS 20 displays a usage method with respect to rights of the selected DRM contents and a type of costs (step S13). The kind of rights usage includes the number of usage (count), the period for usage (interval) and the term for usage (date), while the type of costs includes 'free with AD'.

When the DRM device 10 selects the free with AD (step S14), the PS 20 displays a type of advertisement (e.g., sportswear, soft drink, etc.), advertisement information on each advertisement (e.g., a size of contents, running time, etc.), a rights usage method according to selection of each advertisement (e.g., count, interval, date, etc.) (step S15). The DRM device 10 selects one advertisement and a corresponding rights usage method (step S16). Then, the PS 20 provides information on selected rights, namely, rights of the DRM contents having AD contents attached thereto to the RI 30 (step S17).

The RI 30 requests contents with respect to the selected rights from the CI 40 (step S18), and the CI 40 transmits the requested contents, namely, the AD contents and the DRM contents to the RI 30 (step S19).

Then, the RI 30 generates a multipart DCF file by using the received AD contents and the DRM contents (step S20). The method for generating the multipart DCF file has been described above, so its description will be omitted hereafter.

The RI 30 transmits the generated multipart DCF file to the DRM device 10 (step S21). When the contents and the rights are separately delivered, as shown in FIG. 3, the DRM device 10 requests rights for the received multipart DCF file from the RI 30 (step S22). The RI 30 transmits a download descriptor (DD) and a right object acquisition protocol (ROAP) trigger, namely, guidance information about the issuance of requested rights, to the DRM device 10 (step S23). Then, the DRM device 10 receives the requested rights as issued from the RI 30 according to a general 2-path ROAP procedure. Namely, when the DRM device 10 transmits a rights request message to the RI 30, the RI 30 authenticates the DRM device 10 and issues the requested rights to the DRM device 10.

When the RI 30 issues the rights to the DRM device 10, the RI 30 does not charge the DRM device 10 a fee for the rights. In this case, after generating the multipart DCF at the step S20, the RI 30 may charge the CI or an advertiser (or sponsor) the cost (fee) for the rights.

Though not shown in FIG. 4, when contents and the rights are delivered together, the DRM device 10 does not need to request the rights with respect to the selected DRM contents from the RI 30.

Especially, the operation of downloading the AD contents-attached DRM contents can be performed by the download agent 11 of the DRM device 10.

A method for decoding the downloaded AD contents-attached DRM contents by the DRM device 10 will now be described. The decoding operation can be performed by the parsing unit 12 of the DRM device 10.

Figure 5:
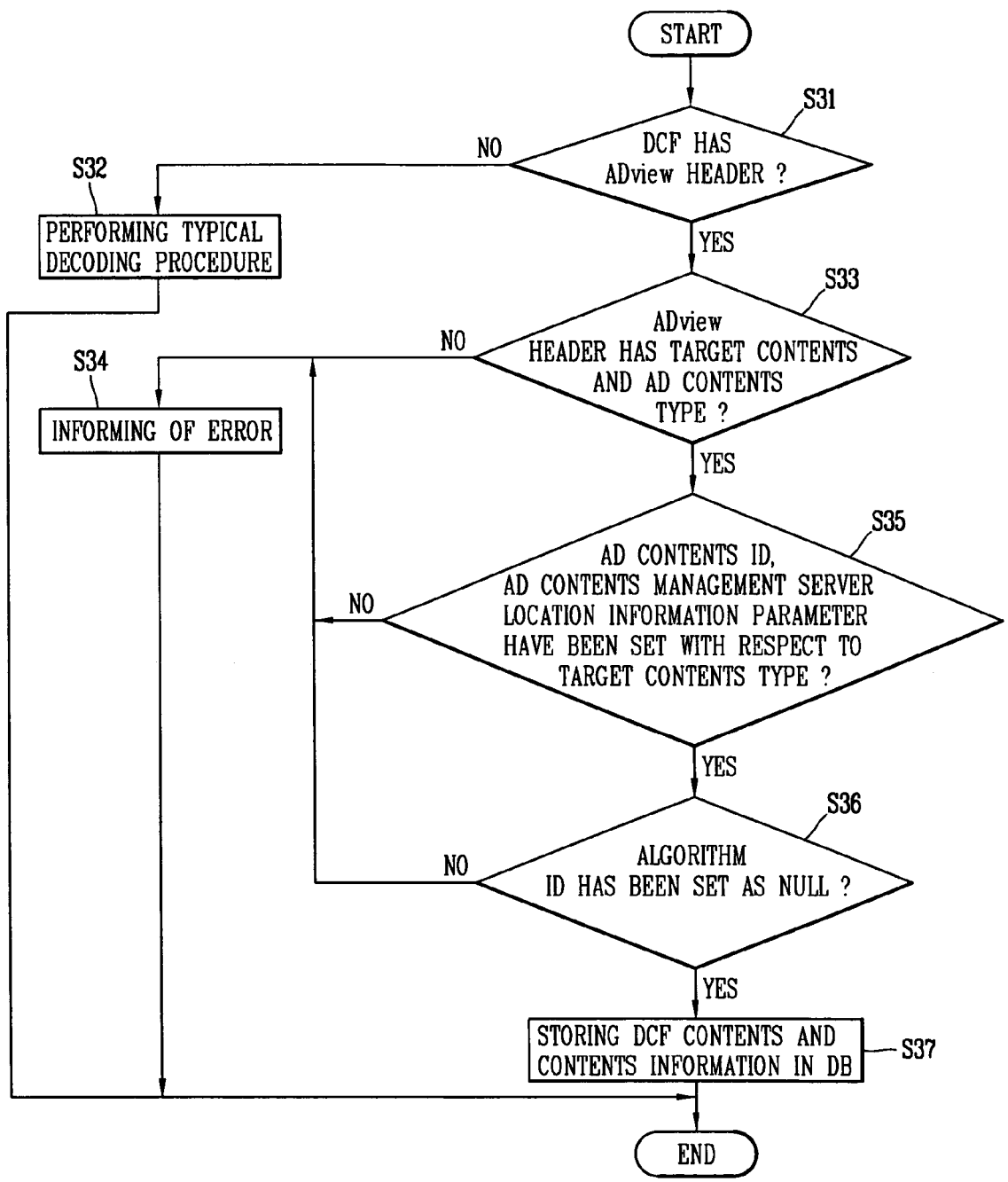
FIG. 5 is a flow chart illustrating the processes of an exemplary method for decoding DRM contents having AD contents attached thereto by a DRM device in accordance with the present invention.

FIG. 5 is a flow chart illustrating the exemplary processes of the method for decoding DRM contents having AD contents attached thereto by the DRM device in accordance with the present invention.

The DRM device 10 checks whether there is an ADview header in the DCF header field of each DRM container of the multipart DCF file which has been downloaded from the IR 30 (step S31). If there is no ADview header therein, the DRM device 10 performs a typical decoding procedure (step S32).

However, when the ADview header exists in the DCF header field of each DRM container, the DRM device 10 checks whether each ADview header has a target contents type or an AD contents type (step S33). Namely, the DRM device 10 checks whether the target contents type for the first ADview header is included in the DCF header field of the first DRM container of the multipart DCF file and whether the AD contents type for the second ADview header is included in the DCF header field of the second DRM container. If each ADview header does not have the target contents type or the AD contents type, the DRM device 10 informs a user of an error (step S34).

If, however, each ADview header has the target contents type and the AD contents type, namely, if the first ADview header has the target contents type and the second ADview header has the AD contents type, the DRM device 10 checks whether the AD contents ID (adview-element-uri) parameter and the AD contents management server location information (adview-report-url) parameter have been set with respect to the target contents type (step S35). If the AD contents ID (adview-element-uri) parameter and the AD contents management server location information (adview-report-url) parameter have not been set with respect to the target contents type, the DRM device 10 informs the user of a corresponding error (step S34).

If, however, the AD contents ID (adview-element-uri) parameter and the AD contents management server location information (adview-report-url) parameter have been set with respect to the target contents type, the DRM device 10 checks whether an algorithm ID parameter with respect to the AD contents type has been set as null (step S36). If the algorithm ID parameter with respect to the AD contents type has not been set as null, the DRM device 10 informs the user of a corresponding error (step S34).

If, however, the algorithm ID parameter with respect to the AD contents type has been set as null, the DRM device 10 stores the downloaded multipart DCF file in the database 14 (step S37).

Finally, an exemplary method of reproducing the decoded AD contents-attached DRM contents by the DRM device 10 will now be described.

Figure 6:
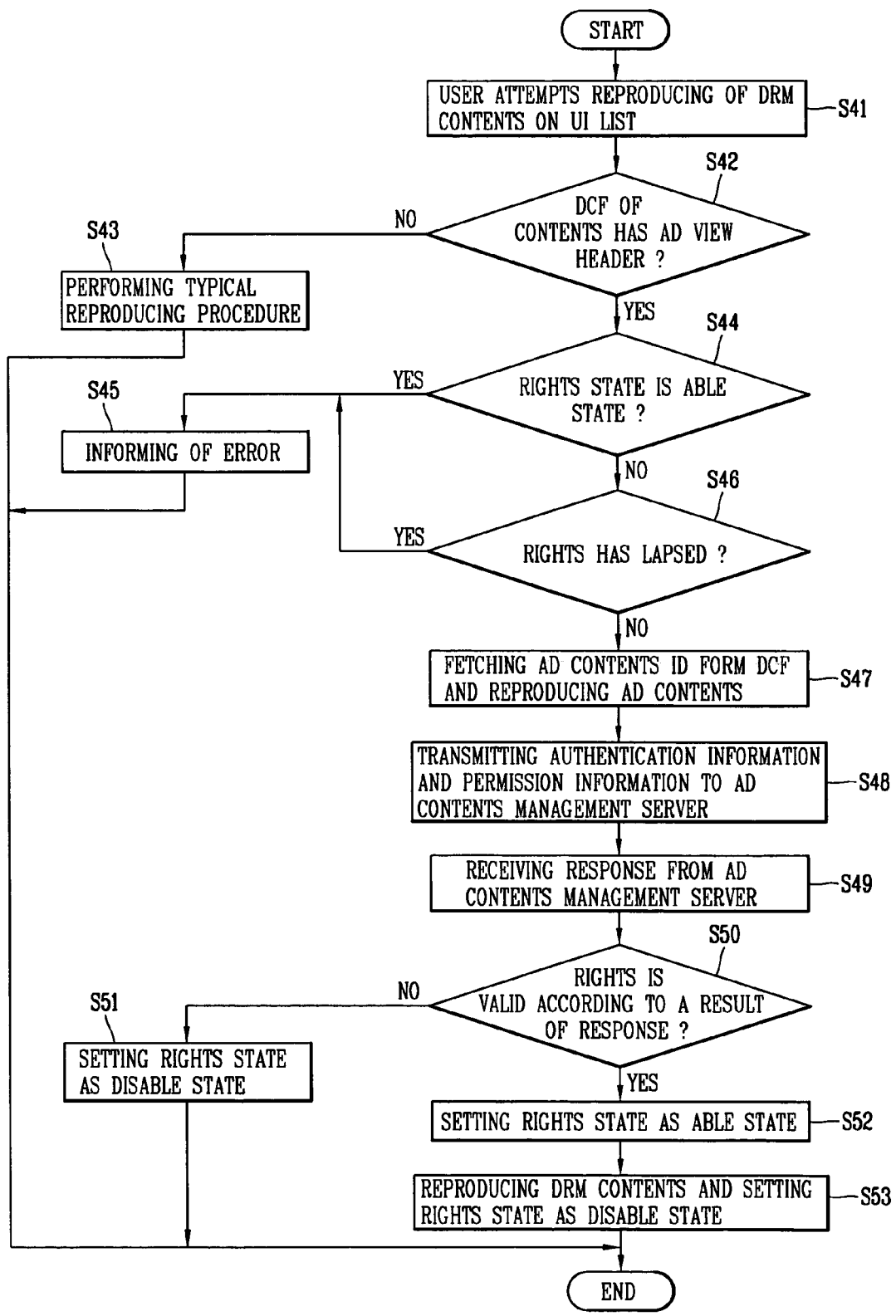
FIG. 6 is a flow chart illustrating the processes of an exemplary method for reproducing DRM contents having AD contents attached thereto by the DRM device in accordance with the present invention.

FIG. 6 is a flow chart illustrating the exemplary processes of the method for reproducing DRM contents having AD contents attached thereto by the DRM device in accordance with the present invention.

The user of the DRM device 10 attempts reproduction of desired DRM contents among a list displayed user interface (UI) list (i.e., a list of DRM contents to be reproduced) (step S41). Then, the DRM device 10 checks whether the DCF of the DRM contents has the ADview header (step S42). If the DCF does not have the ADview header, the DRM device 10 performs a typical reproduction procedure (step S43).

If, however, the DCF has the ADview header, the DRM device 10 checks whether the rights state of the DRM contents is an activated (able) state (step S44). If the rights state of the DRM contents is the activated state, the DRM device 10 informs the user of a corresponding error (step S45).

If, however, the rights state of the DRM contents is not the activated state, the DRM device 10 checks whether rights of the DRM contents is valid (step S46). Namely, the DRM device 10 checks whether rights of the DRM contents has lapsed (e.g., checks whether the term of its usage has expired). If the rights have lapsed, the DRM device 10 informs the user of a corresponding error (step S45).

If, however, the rights have not lapsed, the DRM device 10 fetches the AD contents ID from the DCF and reproduces the AD contents (step S47).

And then, the DRM device 10 checks the AD contents management server 31 by using the AD contents management server location information of the DCF and transmits authentication information and permission information to the AD contents management server 31 in order to report the AD contents usage state information (step S48). The authentication information may include an ID of the DRM device 10 and can be used to authenticate the DRM device 10 whether it is an authorized device. The permission information can be used to check whether the rights of the DRM contents is valid, and may include the ID of the DRM contents and the number of usage times of AD contents and a rights usage state according to a method of using the rights of the DRM contents. Herein, the method of using the rights of the DRM contents is the same as the method of using the rights of the DRM contents selected by the DRM device 10 after being connected with the PS 20. For example, if the method of using the rights of the DRM contents is the number of usage times, the rights usage state may indicate the current number of usage times of the DRM contents, and if the method for using the rights of the DRM contents is the term of the usage, the rights usage state indicates current date information.

Then, the AD contents management server 31 checks whether the DRM device 10 is a normal device based on the authentication information and permission information which have been reported by the DRM device 10, checks DRM contents corresponding to the DRM contents ID, and also checks whether the DRM device 10 normally uses the rights of the DRM contents according to the method of using the rights of the DRM contents.

The AD contents management server 31 generates a response message based on the checked information and transmits it to the DRM device 10. Herein, checking by the AD contents management server 31 about whether the rights with respect to the DRM contents to be reproduced by the DRM device 10 is valid or not based on the authentication information and permission information transmitted form the DRM device 10, refers to a double-checking of the rights usage through the AD contents, and an advertiser or a sponsor can generate statistics information with respect to AD contents based on the reported authentication information and permission information. The statistics information may include statistics data as to how many users come in contact with the advertisement or how frequently users come in contact with advertisement.

Thereafter, when a response message is received from the AD contents management server 31 (step S49), the DRM device 10 checks whether the rights of the DRM contents is valid based on the received response (step S50). If the rights of the DRM contents it not valid, the DRM device 10 sets the rights state of the DRM contents as a disable state and terminates the reproduction procedure (step S51).

If, however, the rights of the DRM contents are valid, the DRM device 10 sets the rights state of the DRM contents as an able (activated) state (step S52) and reproduces the DRM contents. When reproducing of the DRM contents starts, the DRM device 10 changes the rights state to a disable state (step S53).

As so far described, the apparatus and method for processing DRM contents having advertising contents attached thereto in accordance with the present invention can have many advantages.

First, by adding the ADview header for indicating DRM contents having AD contents attached thereto and inserting the DRM contents and the AD contents into the DCF file, AD contents-attached DRM contents can be generated.

Second, when the DRM device decodes the multipart DCF file, it checks whether the ADview header is included in the multipart DCF file, whether a contents type for the ADview header is set as the target contents type and the AD converts type, whether the AD contents ID parameter and the AD contents management server location information parameter for the target contents type have been designated, and whether an algorithm ID for the AD contents type has been set as null, in order to determine whether the multipart DCF file is for DRM contents having the AD contents attached thereto.

Third, when the DRM contents having the AD contents are reproduced, the DRM device reproduces the AD contents and then reports authentication information and permission information to the AD contents management server in order to check whether rights of the DRM contents according to the reproduced AD contents is valid. Accordingly, the validity of the rights of the AD contents-attached DRM contents can be double-checked by the DRM device and the AD contents management server, such that the rights of the DRM contents can be properly managed, and in addition, by collecting the authentication information and the permission information, statistics information with respect to the AD contents can be generated.

Fourth, the DRM contents having the AD contents attached thereto can be provided to the DRM device, and when the DRM device reproduces the AD contents, the DRM contents can be used free of charge. Thus, a developer can provide valuable DRM contents to a user at low cost, an advertiser can advertise a product to users in an effective manner through the latest DRM device, and a user can not only obtain the latest information about various products (or services) and also use desired DRM contents free of charge.

Thus, the present invention provides a device to support digital rights management, comprising: a download agent to download digital contents having advertisement information attached thereto; a parsing unit to check whether the downloaded digital contents contains advertisement information and decoding the downloaded digital contents; and an application program to reproduce the downloaded digital contents only after the advertisement information has been viewed by an authorized user.

The present invention further comprises: a digital rights management agent for connecting the digital contents and the advertisement information with the application program, and presenting unauthorized copying of the digital contents by requiring the advertisement information to be viewed by the authorized user prior to reproducing the digital contents.

Also, the authorized user is allowed to reproduce the digital contents free of charge in return for viewing the advertising information.

Furthermore, an advertiser that provided the advertising information can submit payment to a provider of the digital contents for attaching their advertising information to the digital contents to be downloaded by an authorized user.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A system for processing digital rights management (DRM) contents having advertising contents (AD contents) attached thereto, comprising:
   a rights issuer (RI) configured to generate a multipart DRM contents format (DCF) file by attaching AD contents to DRM contents and issuing rights with respect to the contents; and
   a DRM device configured to download the AD contents-attached DRM contents and reproducing the AD contents to use the DRM contents, wherein the multipart DCF file includes an AD contents view header indicating an indication that the DRM contents have a attached AD content,
   wherein a DCF header field is added to each of two DRM containers of the multipart DCF file, wherein the DRM contents are added in one DRM container and the AD contents are added in the other DRM container.

2. The system of claim 1, wherein the RI provides the multipart DCF file to the DRM device and manages rights of the DRM contents according to usage information of the AD contents reported by the DRM device.

3. The system of claim 2, wherein the RI includes an AD contents management server for managing rights of the AD contents-added DRM contents according to authentication information and permission information according to the use of AD contents reported by the DRM device and collecting statistics information of the AD contents according to the report on the authentication information and the permission information.

4. The system of claim 1, further comprising:
   a contents issuer (CI) configured to provide the AD contents and the DRM contents; and
   a presentation server (PS) configured to provide a type of use for rights of the DRM contents having the AD contents attached thereto.

5. The system of claim 4, wherein the PS provides rights information of the AD contents-attached DRM contents selected by the DRM device to the RI.

6. The system of claim 5, wherein the RI requests the AD contents and the DRM contents from the CI and generates the multipart DCF file by using the AD contents and the DRM contents received from the CI.

7. The system of claim 1, wherein the multipart DCF file comprises:
   a first DRM container including a DCF header field having a first AD contents view header for indicating attachment of AD contents, and a contents field having the DRM contents; and
   a second DRM container including a DCF header field having a second AD contents view header for indicating attachment of AD contents, and a contents field having the AD contents.

8. The system of claim 7, wherein the first and second AD contents view headers are a target contents type or an AD contents type.

9. The system of claim 8, wherein if the first AD contents view header is the target contents type, it has an AD contents ID parameter and location information parameter of AD contents management server.

10. The system of claim 8, wherein if the second AD contents view header is the AD contents type, it has an algorithm ID parameter set as null.

11. The system of claim 1, wherein the DRM device checks whether the multipart DCF file includes the DRM contents and the AD contents based on the AD contents view header, reproduces the AD contents of the multipart DCF file, reports authentication information and permission information according to reproduction of the AD contents to the AD contents management server, checks a response message received from the AD contents management server, and reproduces the DRM contents if the rights of the DRM contents is valid.

12. The system of claim 11, wherein the authentication information includes an ID of the DRM device and the permission information includes an ID of the DRM contents, the number of usage times of the AD contents, and a rights usage state according to a method of using the rights of the DRM contents.

13. The system of claim 12, wherein if the method of using the rights of the DRM contents is the number of usage times, the rights usage state indicates the current number of usage times of the DRM contents, and if the method of using the rights of the DRM contents is a term of the usage, the rights usage state indicates current date information.

14. The system of claim 1, wherein the DRM device comprises:
   a download agent configured to download AD contents-attached DRM contents;
   a parsing unit configured to check whether the DRM contents has the AD contents and decoding the DRM contents;
   a DRM agent configured to connect the DRM contents and the AD contents with a DRM application program for reproducing and managing rights of the DRM contents according to usage of the AD contents; and
   a database (DB) configured to manage rights state information of the DRM contents.

15. The system of claim 1, wherein the DRM device is a mobile terminal.

16. A method for processing digital rights management (DRM) contents, comprising:
   generating by a right issuer (RI) a multipart DRM contents format (DCF) file by attaching AD contents to DRM contents; and
   downloading the generated multipart DCF file to a DRM device; and
   reproducing by the AD contents, the AD contents to use the DRM contents, wherein generating the multipart file includes an AD contents view header indicating an indication that the DRM contents have an attached AD content,
   wherein a DCF header field is added to each of two DRM containers of the multipart DCF file, wherein the DRM contents are added in one DRM container and the AD contents are added in the other DRM container.

17. The method of claim 16, wherein the AD contents view header includes a target contents type for the DRM contents and an AD contents type for the AD contents.

18. The method of claim 17, wherein the AD contents view header has an algorithm ID parameter set as null for the AD contents type.

19. The method of claim 16, wherein the AD contents view header includes an AD contents ID parameter and a location information parameter of an AD contents management server for the target contents type.

20. The method of claim 16, further comprising:
checking by the DRM device whether the DRM contents include the AD contents by decoding the downloaded multipart DCF file; and
reproducing the AD contents if the DRM contents includes the AD contents, and using the DRM contents free of cost.

21. The method of claim 20, wherein the step of downloading the multipart DCF file comprises:
connecting by the DRM device to a presentation server (PS) and selecting one DRM contents;
informing, by the PS, the DRM device of a kind of costs for the rights of the DRM contents;
selecting by the DRM device 'free with AD' among the kind of costs;
selecting, by the DRM device, a method for using the advertisement and the rights of the DRM contents according to 'free with AD';
providing, by the PS, information on the selected method for using the advertisement and the rights of the DRM contents to the RI;
requesting, by the RI, the AD contents and the DRM contents from a contents issuer (CI) according to the information on the method for using the advertisement and the rights of the DRM contents;
providing by the CI the advertising contents and the DRM contents to the RI; and
generating, by the RI, the multipart contents format file by using the received AD contents and the DRM contents and downloading the multipart DCF file to the DRM device.

22. The method of claim 20, wherein the step of checking whether the DRM contents include the AD contents comprises:
checking, by the DRM device, whether the multipart DCF file includes an AD contents view header for indicating attachment of the AD contents;
if the multipart DCF file includes the AD contents view header, checking, by the DRM device, whether the AD contents view header includes a target contents type for the DRM contents and an AD contents type for AD contents;
if the AD contents view header includes the target contents type an the AD contents type, checking by the DRM device whether an AD contents ID parameter and a location information parameter of an AD contents management server have been designated for the target contents type;
if the two parameters have been designated, checking by the DRM device whether an algorithm ID parameter has been set as null for the AD contents type; and
if the algorithm ID parameter has been set as null, determining by the DRM device that the DRM contents include the AD contents.

23. The method of claim 22, wherein if the multipart DCF file does not have the AD contents view header, the DRM device determines that the DRM contents does not have the AD contents.

24. The method of claim 20, wherein the step of using the DRM contents free of cost comprises:
checking by the DRM device whether the multipart DCF file includes an AD contents view header indicating attachment of the AD contents;
if the multipart DCF file includes the AD contents view header, checking by the DRM device whether a rights state of the DRM contents is an able state;
if the rights state is the able state, informing by the DRM device of an error, and if the rights state is not the able state, reproducing the AD contents;
transmitting, by the DRM device, authentication information and permission information according to the use of the AD contents to an AD contents management server;
if it is determined that the rights of the DRM contents is valid according to a response from the AD contents management server, setting, by the DRM device, the rights state as able state and reproducing the DRM contents free of cost; and
initializing, by the DRM device, the rights state into a disable state.

25. The method of claim 24, wherein the authentication information includes an ID of the DRM device and the permission information includes an ID of the DRM contents, the number of usage times of the AD contents, and a rights usage state according to a method of using the rights of the DRM contents.

26. The method of claim 25, wherein if the method of using the rights of the DRM contents is the number of usage times, the rights usage state indicates the current number of usage times of the DRM contents, and if the method of using the rights of the DRM contents is a term of the usage, the rights usage state indicates current date information.

27. A method for processing digital rights management (DRM) contents having advertising contents (AD contents) attached thereto, comprising:
selecting by a DRM device, DRM contents having the AD contents attached thereto;
providing by a presentation server (PS), information on the AD contents-attached DRM contents to a rights issuer (RI);
requesting by the RI, the AD contents and the DRM contents from a contents issuer (CI);
providing by the CI, the AD contents and the DRM contents to the RI;
generating a multipart DRM contents format (DCF) file by the RI by using the provided AD contents and the DRM contents; and
downloading the generated multipart DCF file to the DRM device, wherein the multipart file includes an AD contents view header indicating an indication that the DRM contents have a attached AD content,
wherein a DCF header field is added to each of two DRM containers of the multipart DCF file, wherein the DRM contents are added in one DRM container and the AD contents are added in the other DRM container.

28. The method of claim 27, further comprising:
receiving, by the DRM device, issued rights with respect to the DRM contents by interworking with the RI, when the multipart DCF file is downloaded.

29. The method of claim 27, wherein the AD contents view header includes a target contents type for the DRM contents and an AD contents type for the AD contents.

30. The method of claim 29, wherein the AD contents view header has an algorithm ID parameter set as null for the AD contents type.

31. The method of claim 27, wherein the AD contents view header includes an AD contents ID parameter and a location information parameter of an AD contents management server for the target contents type.

* * * * *